United States Patent

Kagei et al.

Patent Number: 6,070,979
Date of Patent: Jun. 6, 2000

[54] PLASTIC LENSES FOR SPECTACLES WITH HIGH REFRACTIVE INDICES

[75] Inventors: Kazunori Kagei; Tadashi Kobayashi, both of Fukui, Japan

[73] Assignee: Asahi Lite Optical Co., Ltd., Fukui, Japan

[21] Appl. No.: 08/849,546

[22] PCT Filed: Oct. 24, 1996

[86] PCT No.: PCT/JP96/03099

§ 371 Date: Jul. 8, 1997

§ 102(e) Date: Jul. 8, 1997

[87] PCT Pub. No.: WO97/15858

PCT Pub. Date: May 1, 1997

[30] Foreign Application Priority Data

Oct. 24, 1995 [JP] Japan ................................ 7-275509

[51] Int. Cl.$^7$ ........................................... G02C 7/02
[52] U.S. Cl. ................................................ 351/159
[58] Field of Search ................................ 351/159, 163, 351/166; 525/131; 528/67, 59, 76; 359/642

[56] References Cited

U.S. PATENT DOCUMENTS 5,059,673 10/1991 Kanemura et al. ...................... 528/67
5,736,609 4/1998 Irizato et al. ............................ 351/159

FOREIGN PATENT DOCUMENTS 63-141001 6/1988 Japan .
03109502 5/1991 Japan .
06337376 12/1994 Japan .

*Primary Examiner*—George Manuel
*Attorney, Agent, or Firm*—Jordan and Hamburg

[57] ABSTRACT

A base lens of a polyurethane resin comprising a polyisocyanate compound and a polythiol, a sulfur-containing polyol or the like is coated with a primer layer having a thickness sufficient for shock absorption, an organosiloxane-type, hard coat layer having a refractive index of 1.47 or more, and optionally a thin metal layer in that order. As having this constitution, the plastic lens has a mechanical strength resistant to striking energy of not smaller than 4 times the striking energy value of the FDA Standard, 0.204 joules, when the center thickness of the lens is from 0.7 mm to less than 1.2 mm. Since the latitude in the acceptable range for the conditions for the processing of the lens (relative to the thickness of each constitutive layer) is large, the producibility of the lens is high. An inhomogeneous layer may be formed between the adjacent layers, which reduces the reflectivity of the lens for transmitting light and prevents the formation of interference fringes in the lens. An ultraviolet absorbent, if added to the hard coat layer, can cut off ultraviolet rays, while preventing the base lens and the coat layers from being aged, and is helpful in protecting eyeballs.

7 Claims, 1 Drawing Sheet

PLASTIC LENSES FOR SPECTACLES WITH HIGH REFRACTIVE INDICES

TECHNICAL FIELD

The present invention relates to plastic lenses for spectacles with high refractive indices, which have excellent impact resistance.

BACKGROUND ART

Plastic lenses for spectacles have various characteristics, which glass lenses do not have, in that they are lightweight, they are hardly broken and they are easily dyeable. Heretofore, acrylic resins, polycarbonate resins and ADC resins have been used to produce such plastic lenses. At present, urethane resins with high refractive indices are used to produce them, and plastic lenses with refractive indices of higher than 1.60 are sold in the market. Minus lenses with refractive indices of 1.60 or higher may be thinned even at their peripheries, and such thin lenses look nice. However, in order to reduce the weight of plastic lenses, it is still desired to further thin their center parts as much as possible, while removing the aberration to occur on their aspherical areas, thereby to further thin their peripheries.

As having good optical characteristics and other various excellent characteristics, plastic lenses are superior to glass lenses but the scratch resistance of the former is much lower than that of the latter. Therefore, for plastic lenses for use in spectacles, it is indispensable to coat their surfaces with a hard coat layer.

In order to improve their scratch resistance, plastic lenses may be coated with a hard coat layer comprising any of organic silicon compounds and epoxy resins. The hard coat layer of that type is very advantageous, when it is further coated with a thin metal film to form a non-glare layer thereon. However, the lens with the constitution of that type is seriously defective in that, if the hard coat layer and the non-glare layer are cracked on impact, the base lens will also be cracked often resulting in complete breakage of the lens. In general, if a plastic lens is directly coated with a hard coat layer and if the hard coat layer is over-coated with an inorganic layer of, for example, $TiO_2$, $ZrO_2$ or $SiO_2$, through vacuum vapor deposition, the thus-coated lens shall have poor impact resistance and is easily cracked since the layers are very brittle though being hard. Therefore, it is said that, if such layers are simply formed on a plastic lens, the impact resistance of the coated lens will be lowered to 1/20 or less of the original impact resistance of the non-coated lens.

In order to ensure the reliable safety of spectacles for users, we, the present inventors have assiduously studied to develop plastic lenses for spectacles which have high impact resistance satisfying the requirements for commercial use and which are as safe as possible, and, as a result, have found that a plastic lens having a primer layer with a predetermined thickness or larger as formed between the base lens and the hard coat layer may have improved impact resistance.

In Japanese Kokai Patent Publication Nos. 63-87223 and 63-141001, disclosed are polyurethane primers to be obtained from a particular polyol or active hydrogen-having compound and a diisocyanate or polyisocyanate. These primers are applied to lenses of diethylene glycol bisallyl carbonate or its copolymer for the purpose of improving the adhesiveness between the lenses and the hard coat layers to be formed on the lenses. In the present invention, preferably used are primers of that type.

The thickness of the center parts of the lenses used in the above-mentioned prior art techniques is 1.6 mm or 1.2 mm. At present, however, recent lenses with high refractive indices may be further thinned with the increase in their refractive indices. For example, the thickness of the center parts of such lenses with high refractive indices may be from 0.7 mm to less than 1.2 mm. Accordingly, it has become possible to provide minus lenses having thin peripheries and plus lenses having thin center parts, which are fashionable. However, the reduction in the thickness of lenses inevitably results in significant reduction in the impact resistance thereof. Therefore, we, the present inventors have targeted the provision of lenses which may still have high impact strength even when their center parts are thinned in the manner as mentioned above.

The impact resistance of lenses is tested generally in accordance with the FDA Standard, for which a steel ball having a weight of about 16.4 g and a diameter of about 16 mm is dropped onto a lens from a height of 127 cm. In the American National Standard Institute (ANSI Z87.1 1989), stipulated is a method for testing safety spectacles for industrial use, in which a steel ball having a diameter of 25.4 mm is dropped onto a lens from a height of 127 cm. This is to ensure the reliable safety of spectacles for users.

To evaluate the impact resistance of lenses, employed is a test method of dropping a steel ball (16.4 g) as stipulated in the above-mentioned FDA Standard or a steel ball n-times heavier than the steel ball for the FDA Standard, onto a lens to be tested, and the lens thus tested is evaluated to have a degree of safety of "n-times of FDA". In this method, however, if the steel ball used is to have a large diameter, the contact area between the ball dropped and the lens being tested is to be large. Therefore, the data as obtained according to this method could not indicate the true impact resistance of lenses tested. We, the present inventors used, in place of this method, the BRUCETON method as approved by the U.S. OLA. In the BRUCETON method, we used the steel ball (16.4 g) as stipulated in the FDA Standard, while accelerating its dropping speed, and we obtained the striking energy needed for breaking the lens tested to evaluate the degree of safety of the lens. In the FDA Standard, the striking energy is defined to be 0.204 joules (J). Therefore, the impact resistance of the lens tested according to the BRUCETON method is represented by the multiple of said value, 0.204 J.

On the other hand, as has been so mentioned hereinabove, the formation of a hard coat layer is indispensable for plastic lenses. If, however, the refractive index of the base lens is larger than 1.60, the light reflected on the interface between the hard coat layer and the base lens interferes with the light reflected on the surface of the hard coat layer to often produce interference fringes. Theoretically, there will occur no problem if the refractive index of the base lens is the same as that of the hard coat layer. In fact, however, there is a difference of 0.1 or larger between them. It may be possible to prevent the formation of such interference fringes, if the hard coat layer is much thinned. However, the wavelength of visible rays varies within a range of from 400 nm to 700 nm. Therefore, even when the hard coat layer is thinned as much as possible, such is still problematic in that the thinned hard coat layer may be effective only in preventing the interference fringes from light having a certain wavelength but is ineffective in preventing the others from other light having different wavelengths, and is further problematic in that the thinned hard coat layer could not have satisfactory scratch resistance.

In Japanese Kokai Patent Publication No. 5-341239, we, the present inventors have disclosed the advantages of the plastic lenses for spectacles with high refractive indices which we have commercialized. After this disclosure, we have further studied to improve and enhance the quality and the producibility of various plastic lenses for spectacles, and have now completed the present invention. Specifically, the present invention is to provide lenses for spectacles, which have high impact resistance and which produce few interference fringes. In addition, according to the present invention, the latitude in the acceptable modification of conditions for surface treatment of lenses is enlarged, whereby the producibility of lenses is, after all, much enhanced.

DISCLOSURE OF THE INVENTION

In the present invention, the resin constituting the base lens is a polyurethane resin to be obtained through polymerization of at least one polyisocyanate compound and at least one polythiol and/or sulfur-containing polyol. Preferably, the polyurethane resin has a refractive index of 1.59 or more.

The polyisocyanate may be selected from aliphatic, aromatic or alicyclic diisocyanates, and preferably includes, for example, m-xylylene diisocyanate, isophorone diisocyanate, tolylene diisocyanate, hexamethylene diisocyanate, and 4,4'-diphenylmethane diisocyanate.

The polythiol for use in the present invention is preferably a dithiol or polythiol, including, for example, di(2-mercaptoethyl) ether, pentaerythritol tetrakisthioglycolate, pentaerythritol tetrakis(3-mercaptopropionate), and 1,2-bis [(2-mercaptoethyl)thio]-3-mercaptopropane.

In the present invention, the surface of the base lens is coated with a primer layer comprising a polyurethane resin and having a thickness sufficient for shock absorption. Though not indiscriminately defined, the thickness of the layer may be generally from 0.4 to $6\mu$, but preferably from 0.8 to $3\mu$. If its thickness is smaller than $0.4\mu$, the layer could not sufficiently absorb the striking energy applied thereto and therefore could not protect the coated lens from being cracked. However, if it is larger than $6\mu$, the degree of profile regularity of the layer is low, so that the images as transmitted through the coated lens will be often deformed.

The polyurethane resin to form the primer layer may be preferably selected from thermoplastic polyurethanes to be produced from diisocyanates and diols, such as those disclosed in Japanese Kokai Patent Publication No. 63-87223 and Japanese Patent Publication No. 61-287680, and thermosetting polyurethanes such as those disclosed in Japanese Kokai Patent Publication No. 3-109502. In addition, also usable are polyurethane resins containing fine inorganic particles, such as those disclosed in Japanese Kokai Patent Publication No. 6-337376.

The surface of the primer layer is coated with an organosiloxane-type, hard coat layer having a refractive index of 1.47 or more.

The composition to form the hard coat layer may be a curable composition consisting essentially of a silicone resin. As one example, referred to is a composition comprising a base resin, which is typically derived from a silanol compound substituted with an alkyl group, an alkenyl group, an allyl group, a vinyl group, or a hydrocarbon group having an epoxy group, a halogen group, an amino group, a methacryloxy group or the like, or a hydrolysate or partial condensate thereof, and a colloidal silica having a particle size of from 1 to 50 m$\mu$ as dispersed in said base resin. In order to enlarge the refractive index of the layer, fine particulate zirconia, iron or the like may be added to the composition.

If an ultraviolet absorbent is added to the resin that shall constitute the hard coat layer, it is possible to prevent the resins constituting the base lens, the primer and the hard coat from being aged, and also to protect eyeballs. As the ultraviolet absorbent, for example, preferably used are benzophenone derivatives, benzotriazole derivatives, and cyanoacrylate derivatives.

The thickness of the hard coat layer may be generally from 1 to $8\mu$, preferably from 2 to $4\mu$. If its thickness is smaller than $1\mu$, the scratch resistance and the impact resistance of the layer will be poor; but, on the contrary, if it is larger than $8\mu$, the layer will be uneven to have a low degree of profile regularity. Needless-to-say, the hard coat layer formed on a lens must have the same thickness entirely on the lens. If not, the lens coated with such an uneven hard coat layer produces irregular interference fringes, and looks bad.

It is desirable to overcoat the hard coat layer with at least one non-glare, thin metal film. The thin metal film is preferably a thin film of a metal oxide such as $TiO_2$, $SiO_2$, $ZrO_2$ or the like.

As having the constitution mentioned hereinabove, the lens of the present invention can have a high impact-resistant strength of not smaller than 4 times the striking energy value of the FDA Standard, 0.204 joules, even when the thickness of the center part of the lens is from 0.7 mm to less than 1.2 mm.

In addition, some difference in the condition for surface treatment of the lens (relative to the thickness of each constitutive layer), if any, has few influences on the quality of the lens, and, therefore, the latitude in the acceptable condition for surface treatment of the lens is enlarged.

A second aspect of the present invention is to provide plastic lenses for spectacles with high refractive indices, in which at least one of the interface between the plastic lens base and the primer layer, the interface between the primer layer and the hard coat layer, the interface between the hard coat layer and the thin metal layer, and the interface between the hard coat layer and air is processed to have fine projections and/or depressions each having a radius of curvature of from 15 nm to 150 nm to give an inhomogeneous layer. Interference fringes to be caused by reflected rays are removed from the lenses of that type. Accordingly, in this second aspect of the invention, the non-glare layer of a multi-layered, thin metal film is not specifically needed, but a single-layered, thin metal film may be formed on the hard coat layer in order to improve the scratch resistance of the layer.

If desired, the inhomogeneous layer having such fine projections and/or depressions on its surface may be coated with a fluorine coating agent, which is helpful in improving the water-repellency and the stain resistance of the lens. In addition, since the film of the agent has a low refractive index of 1.36, it is also helpful in preventing the lens from glaring.

BEST MODES OF CARRYING OUT THE INVENTION

Figure 1:
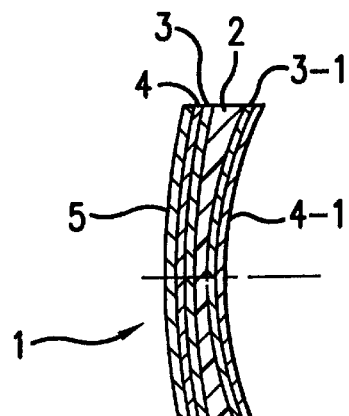
FIG. 1 is a graphical, cross-sectional view illustrating a plastic lens (1) for spectacles with high refractive indices of the present invention.
Figure 2:
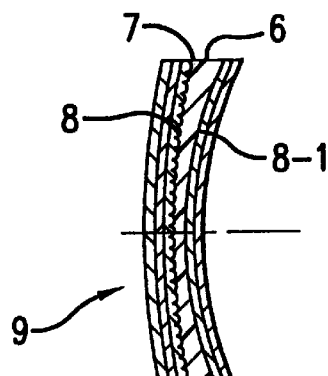
FIG. 2 is a graphical, cross-sectional view illustrating a plastic lens for spectacles with high refractive indices of the second aspect of the present invention, in which is formed an inhomogeneous layer (7) having fine projections and/or depressions on its surface, on the plastic lens base (6).
Figure 3:
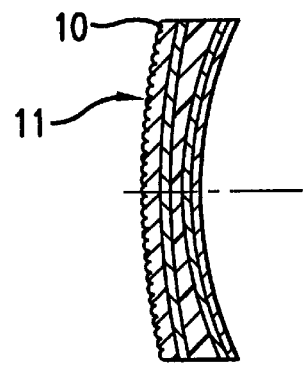
FIG. 3 is a graphical, cross-sectional view illustrating a plastic lens for spectacles with high refractive indices, in which is formed an inhomogeneous layer (11) having fine projections and/or depressions on its surface, on the hard coat layer (10).

The plastic lenses for spectacles with high refractive indices of the present invention, which are shown in FIG. 1 to FIG. 3, are produced according to the methods mentioned hereinunder.

EXAMPLE 1

Solution A and Solution B of MR-7 (trade name, produced by Mitsui Toatsu Chemical) were mixed in an equivalent ratio of 1:1, to which was added a catalyst, fully stirred and degassed to prepare a polyurethane resin comprising a polyisocyanate compound and a polythiol. The resin composition thus prepared was cast into a predetermined, casting cell for minus lenses, stored in a dark and cold room and spontaneously degassed for one full day.

Immediately after having been taken out of the dark and cold room, the cell was closed and put into a heater where the cell was gradually heated from room temperature up to 100° C. over a period of about 20 hours.

Then, the cell was broken and the cured resin part was taken out. In order to remove the remaining, non-reacted residue therefrom, the cured resin part was annealed at 120° C. for 2 hours, whereby it was completely cured. In that manner, obtained were two plastic lenses (2). The slit of the casting cell was so adjusted that the thickness of the center part of each lens could be 0.7 mm or 1.0 mm.

The thus-obtained, two plastic lenses were washed with pure water, using an ultrasonic washing machine, and then dipped in a primer solution comprising a polyurethane resin, thereby forming a primer layer (3) (3-1) having a dry thickness of $0.8\mu$ for the lens having a center thickness of 0.7 mm or $2\mu$ for the lens having a center thickness of 1.0 mm.

After the primer layer (3) (3-1) was set to touch, the lenses were dipped in an organosiloxane-type, hard coat-forming solution, whereupon the coating conditions were so controlled that the hard coat layer (4) (4-1) to be formed could be entirely even to have a dry thickness of $2.6\mu$.

Over the hard coat layer thus formed, a 5-layered, non-glare, thin metal film (5) was formed through vapor deposition. The striking energy applicable to the lenses before their fracture, when measured according to the BRUCETON method, was 0.86 joules for the lens having a center thickness of 0.7 mm or was 1.56 joules for the lens having a center thickness of 1.0 mm, which was 4.2 times or 7.5 times, respectively, the striking energy of the FDA Standard.

To the hard coat-forming solution employed herein, added was an ultraviolet absorbent comprising a benzophenone derivative, in an amount of about 2% by weight. Accordingly, ultraviolet rays of 380 nm or shorter were completely cut off by the hard coat layer, and the light fastness of the lenses increased. In addition, the base lens and the hard coat layer were prevented from being aged, and the lenses had the ability to protect eyeballs.

Comparative Example 1

Herein prepared was a lens having a hard coat layer and a non-glare layer in the same manner as in Example 1, except that the center thickness of the lens was 0.5 mm and that the thickness of the primer layer was $0.1\mu$. The striking energy applicable to the lens before its fracture, as measured according to the BRUCETON method, was 0.20 joules, which was the same as that of the FDA Standard. Thus, the safety of the lens was unsatisfactory.

Comparative Example 2

In the same manner as in Example 1, a lens of diethylene glycol diallyl carbonate (CR-39) having a center thickness of 1.1 mm was coated with a primer layer having a thickness of $0.8\mu$ and with a hard coat layer having a thickness of $2.5\mu$, on which was formed a non-glare layer. The striking energy applicable to the thus-prepared lens before its fracture, as measured according to the BRUCETON method, was 0.16 joules. The lens was cracked.

EXAMPLE 2

This is to demonstrate one embodiment having an inhomogeneous layer in any one interface between the base lens (2), the primer layer (3), the hard coat layer (4) and air. In this, an inhomogeneous layer is formed in the interface between the base lens (2) and the primer layer (3). For this, used is a casting cell, in which one surface of the mold to give the object-facing surface of a lens is formed to have fine projections and depressions as based on the arrangement of ultra-fine particles of $SiO_2$ or the like, and this roughened surface of the mold is transferred onto the surface of a lens being cast whereby the lens is formed to have an inhomogeneous layer on its object-facing surface.

First, the mold to be used herein was formed to have a rough surface, in the manner mentioned below.

Ethyl silicate $[Si(OC_2H_5)_4]$ was dissolved in ethanol, to which were added $H_2O$ for hydrolysis and a catalyst, $HNO_3$. To the resulting solution, added were ultra-fine particles of $SiO_2$ having a particle size of 120 nm, in an amount of 10% by weight. After its pH was suitably adjusted, the resulting mixture was fully dispersed.

A mold was dipped in the thus-prepared dispersion, and drawn up vertically at a rate of 5 mm/sec. After the volatile component was evaporated, the mold was kept heated at 200° C. for 30 minutes so that the coated liquid was dried up. As a result, a single layer of ultra-fine particles of $SiO_2$ was formed on the shaping surface of the mold, while being tightly fixed thereon.

Using the thus-processed mold, a lens having a high refractive index for spectacles was produced in the same manner as in Example 1. Since the resin to form the base lens is shrunk in the thermal polymerization step, the mold was well controlled under pressure so as to prevent any early release of the cured resin from the mold. After the predetermined polymerization period, the cured resin was taken out of the heating furnace, and then left cooled to room temperature. The cell was broken, and the lens (6) produced was taken out. Curved surfaces each corresponding to the radius of the particle size of the ultra-fine particles were transferred onto the object-facing surface of the lens thus produced, and the thus-roughened surface of the lens is the inhomogeneous layer (7) (FIG. 2).

This lens was ultrasonically washed with pure water, dried, and then coated with a primer solution to form a predetermined primer layer (8) (8-1) thereon. Next, this was coated with a hard coat layer and a thin metal film layer in that order to obtain a final product, lens (9).

The thus-obtained lens (9) was characterized in that the light reflecting on the surface of the lens (6) was reduced to only 0.3% or less, and that the light interfering with the light as reflected on the surface of the hard coat layer was minimized thereby giving no visible interference fringes. The center thickness of the lens was 1.1 mm, and the striking energy applicable to the lens before its fracture was 1.56 joules, which was 7.5 times that of the FDA Standard.

If a metal stamper is formed from the mold used in this Example, which has a single layer of ultra-fine particles as tightly fixed thereon, a large number of molds having the same profile can be produced using the metal stamper. Briefly, a nickel layer is plated on the surface of the mold used in this Example, through vacuum vapor deposition, and a metal stamper is produced from the thus-plated mold through electrocasting that uses the nickel layer as the electrode. Using this metal stamper as the first model, a second model is obtained, to which the profile of the original mold is transferred. This second model shall have the same profile as that of the original mold.

EXAMPLE 3

Ultra-fine particles of $SiO_2$ are fixed onto the surface of a glass sheet having the same curvature as that of the surface of a lens to be produced. Using this glass sheet in the same manner as above, obtainable are a metal stamper and also second and third models to which its profile has been transferred. Using any of this metal stamper and models, a hard coat layer of a lens may be formed to have fine projections and/or depressions on its outer surface.

Briefly, a hard coat-forming solution is applied to a primer-coated base lens to form thereon a hard coat layer (10) having a thickness of about $2.5\mu$. Using a thermal laminator capable of being heated under reduced pressure, the metal stamper as prepared in the manner mentioned above is pressed against this lens, whereby the resulting lens may have a roughened surface having fine projections and depressions with a radius of curvature of 60 nm each. As in FIG. 3, this roughened surface is an inhomogeneous layer (11) that acts as a non-glare layer.

The model used in Example 2 may be used also in this Example; and the model used in this Example may be used in Example 2.

Figure 4:
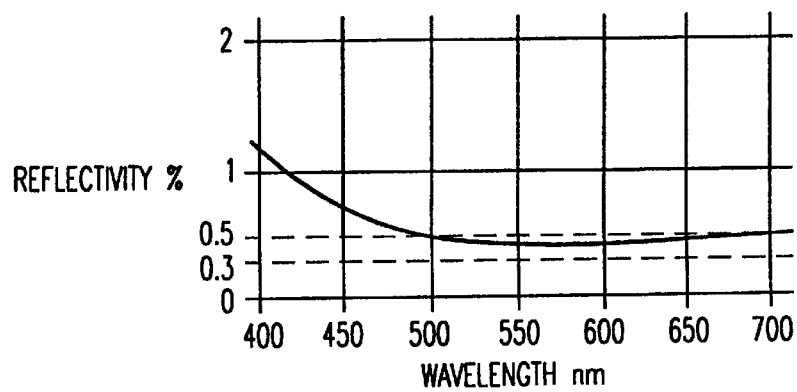
FIG. 4 is a graph showing the light reflectivity characteristic of an inhomogeneous layer having fine projections/and or depressions on its surface.

Owing to the inhomogeneous layer structure formed in the lens of this Example, the refractive indices of the lens continuously vary from the refractive index through air to that through the substance (in this case, to the refractive index of the hard coat layer of being 1.47). Therefore, as in FIG. 4, the reflectivity characteristics of the lens are such that its reflectivity is about 1% at 400 nm, 0.3% at 550 nm (the light of 550 nm is the most stimulative to human beings), and 0.4% at 700 nm. In other words, the reflectivity of the lens is almost the same within the entire region of visible rays. Accordingly, the lens thus having the inhomogeneous layer structure does not specifically require any additional, multi-layered, thin metal film acting as the non-glare layer. If formed, however, the thin metal film is helpful in improving the scratch resistance of the lens.

Also employable is a different method of previously coating the surface of the model with a hard coat-forming solution, followed by pressing the thus-coated surface of the model against the primer layer formed on a lens while squeezing any excess hard coat-forming solution. In this method, it is desirable to dispose a spacer in a spare region around the lens to thereby control the thickness of the hard coat layer to be formed. Anyhow, in this method, it is necessary to take care that no air bubbles are introduced into the layer being formed, during the pressing step.

INDUSTRIAL APPLICABILITY

The lenses for spectacles with high refractive indices of the present invention have high impact resistance of not smaller than 4 times the impact strength as stipulated in the FDA Standard, even though they are thin to have a center thickness of from 0.7 mm to less than 1.2 mm. The lenses are lightweight and produces few interference fringes. Therefore, the lenses are favorably used for safe and fashionable spectacles.

We claim:

1. A plastic lens for spectacles with high refractive indices, comprising a plastic lens base of a polyurethane resin as obtained through polymerization of at least one polyisocyanate compound and at least one polythiol and/or sulfur-containing polyol, a primer layer of a polyurethane formed on said base lens, and an organosiloxane-type, hard coat layer having a refractive index of 1.47 or more formed on said primer layer; which is characterized in that said primer layer has a thickness sufficient for shock absorption, and that, when the thickness of the center part of the lens is from 0.7 mm to less than 1.2 mm, the lens is resistant to striking energy of not smaller than 4 times the striking energy value of the FDA Standard, 0.204 joules.

2. The plastic lens for spectacles with high refractive indices as claimed in claim 1, which has at least one layer of thin metal film as formed on said hard coat layer.

3. The plastic lens for spectacles with high refractive indices as claimed in claim 2, wherein the thin metal film as formed on the hard coat layer is a thin film of a metal oxide.

4. The plastic lens for spectacles with high refractive indices as claimed in claim 1 or 2, which has a roughened surface with fine projections and/or depressions each having a radius of curvature of from 15 nm to 150 nm, as formed in at least one of the interface between the plastic lens base and the primer layer, the interface between the primer layer and the hard coat layer, and the interface between the hard coat layer and air or the thin metal layer.

5. The plastic lens for spectacles with high refractive indices as claimed in claim 1 or 2, wherein the polyurethane resin as obtained through polymerization of at least one polyisocyanate compound and at least one polythiol and/or sulfur-containing polyol has a refractive index of 1.59 or more.

6. The plastic lens for spectacles with high refractive indices as claimed in claim 1 or 2, wherein the thickness of the primer layer of a polyurethane resin is $0.8\mu$ or more.

7. The plastic lens for spectacles with high refractive indices as claimed in claim 1 to 2, wherein the resin to form the hard coat layer comprises an ultraviolet absorbent.

* * * * *